June 4, 1963   J. W. POTSCHKA   3,092,818
VEHICLE LOAD INDICATOR
Filed Feb. 17, 1961
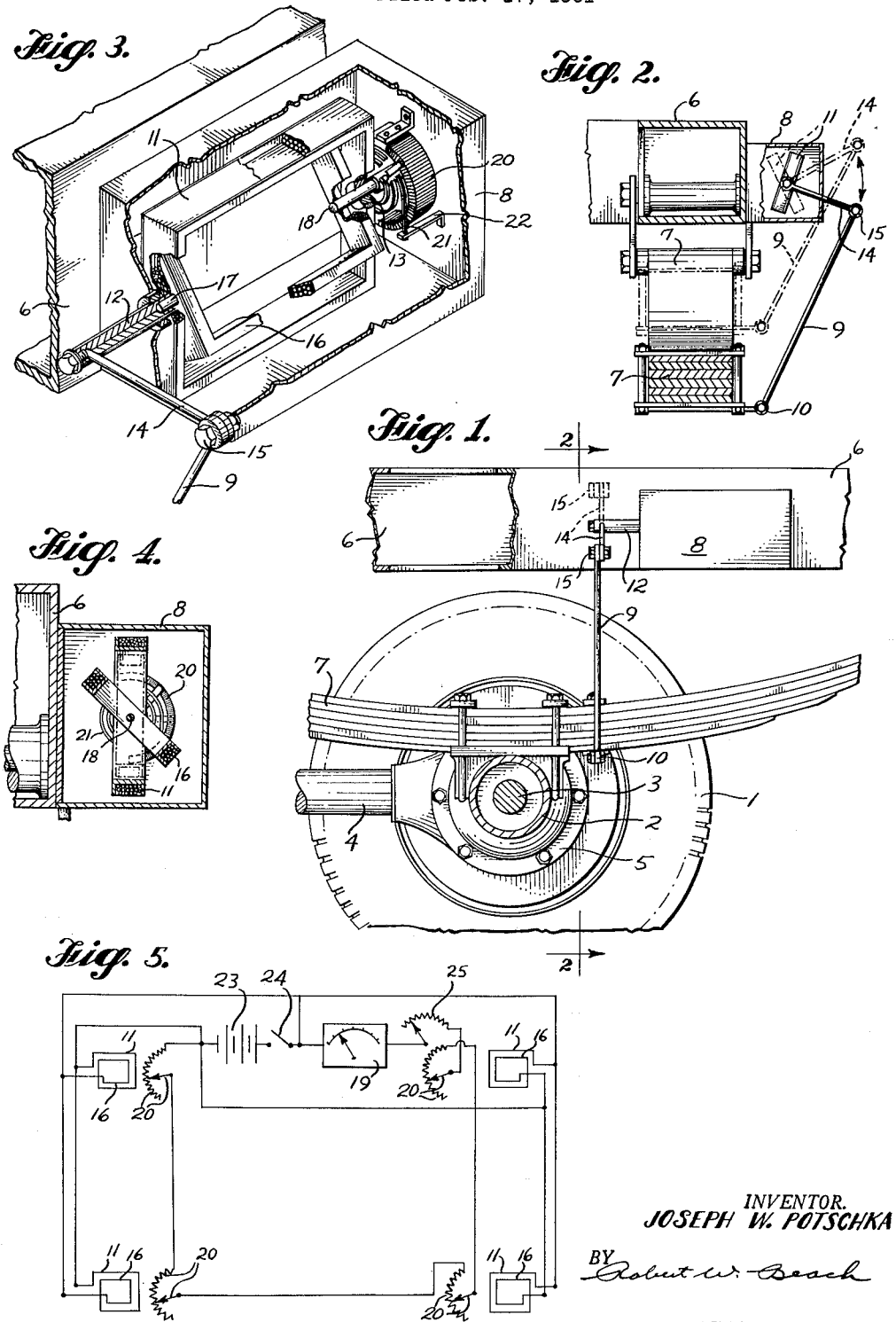
INVENTOR.
JOSEPH W. POTSCHKA
BY Robert W. Beach
ATTORNEY United States Patent Office 3,092,818
Patented June 4, 1963

3,092,818
VEHICLE LOAD INDICATOR
Joseph W. Potschka, Vancouver, British Columbia, Canada, assignor to Potschka Enterprises Ltd., Vancouver, British Columbia, Canada, a corporation of British Columbia, Canada
Filed Feb. 17, 1961, Ser. No. 89,966
4 Claims. (Cl. 340—198)

The present invention relates to a device for indicating variations in load, such as the load on an automotive vehicle and particularly the useful load of a truck, although it could be used for indicating the pay load of an airplane or railway car.

A principal object of the invention is to provide weight-indicating mechanism which normally will be inactive, but which can be energized momentarily to indicate the weight at that particular time.

More specifically, it is an object to provide an indicating member cooperating with a load-positioned member such that the indicating member will normally assume a predetermined position without reference to the load-positioned member, but which can be moved into a predetermined relationship to the load-positioned member irrespective of its position when it is desired to obtain an indication of vehicle weight.

A further object is to provide such a device which can be calibrated and adjusted easily so as to be adapted conveniently to different installations.

It is also an object to provide such a device which is compact and light and which can be mounted easily on a vehicle.

A vehicle load indicator capable of accomplishing these objects may include a reference coil mounted on the vehicle and connected to parts of it which are moved relatively by load fluctuations so as to alter the position of such reference coil. An indicator-activating coil is mounted adjacent to the reference coil, but normally assumes a predetermined position without reference to the position or change in position of the reference coil. When it is desired to obtain a load reading the indicator-activating coil is moved into a predetermined position relative to the reference coil and the position assumed at that time by the indicator-activating coil actuates load-designating mechanism at a location remote from such coil.

FIGURE 1 is an elevation of the vehicle load indicator mounted on a truck, a fragmentary portion of which is shown, and FIGURE 2 is an elevation on line 2—2 of FIGURE 1 with parts broken away.

FIGURE 3 is a top perspective of the vehicle load indicator with parts broken away.

FIGURE 4 is a transverse section through the indicator.

FIGURE 5 is a circuit diagram of a plurality of indicators interconnected in a typical installation on a truck.

It has been proposed heretofore to provide mechanism for indicating the load, or gross weight, of a vehicle, which is mounted permanently on the vehicle, but such mechanism has been cumbersome or of a delicate nature, or inaccurate. The indicator of the present invention will enable the vehicle operator to ascertain the load or weight of the vehicle immediately at any time, but normally the system is deenergized and will be operated only at the will of the operator.

The vehicle load indicator of the present invention is installed on the vehicle so that it is ready for operation at all times. Such indicator can indicate the load on the truck, or the gross weight of the truck and load, while the truck is being loaded or unloaded, or even while the truck is moving, if desired.

The vehicle load indicator includes a load-sensing device for each wheel and the several sensing devices can be interconnected so that the load values sensed by all of such devices will be integrated to provide a composite load, or gross weight, indication. Each of these devices includes a reference member the position of which is established automatically in response to the load on the particular component or wheel with which it is associated, and an indicator-activating member which is instrumental in indicating the position of the reference member.

A preferred type of sensing device installation for one wheel location in an automotive vehicle, such as a truck, is shown in FIGURES 1 and 2. The illustration of the truck parts is purely representative and includes the wheel 1 mounted on the axle housing 2 and rotated by the axle 3 which is driven by the drive shaft 4 through the differential gearing unit 5. The frame 6 is mounted on the axle housing 2 by leaf springs 7. As the load on the frame is increased, the convexity of the leaf spring will be decreased so that the axle housing will be closer to the frame, as indicated in broken lines in FIGURE 2. While actually the frame would move downward, rather than the spring moving upward as shown in broken lines, such representation is merely for the purpose of illustrating the change in relationship of the components resulting from a change in the load.

The load-sensing device is housed in a casing 8 which can be mounted in any suitable fashion on one member of a pair of members the relationship of which changes in accordance with a change in load on the vehicle frame. In the instance illustrated the two members are the frame member 6 and the spring member 7. In the installation of FIGURES 1 to 4, inclusive, the frame member has been selected as the member of the pair on which the sensing device is mounted, but such device could be mounted on the spring member instead if desired. The sensing device is connected to the other member of the pair by a link 9 which is shown connected by pivot 10 to the spring member.

The sensing device is composed primarily of a reference member shifted by relative movement of the frame 6 and axle housing 2 on which the spring 7 is mounted and an indicating member adapted to indicate the position of the reference member. In the installation shown in the drawings the reference member is the flat outer coil 11 of electric wire which is mounted by a shift 12 at one end and a sleeve 13 at the other end to turn relative to the casing 8 and frame 6. As shown in FIGURE 2, the turning of this coil is effected by the link 9 connected to the arm 14 by pivot 15, which arm is secured to the shaft 12 and projects radially from it. The degree to which the coil 11 is turned depends on the alteration in spacing of the frame member 6 and mount for spring 7 resulting from the variations in load on the frame.

The indicator-activating member of the load-sensing device is shown as the flat inner coil 16 which is mounted to turn relative to the casing 8 about the same axis as the coil 11 by the stub shaft 17 projecting into a cavity of the main shaft 12 and the shaft 18 which extends through the sleeve 13 and is journaled in the end of the casing 8 opposite shaft 12. Thus, the two coils 11 and 16 can turn independently about the same axis relative to each other and to the casing 8, or frame 6. To indicate the position of reference coil 11 relative to the casing, it is only necessary to turn coil 16 into a predetermined position relative to coil 11, and be able to ascertain the position of the indicator-activating coil.

It is very desirable to be able to ascertain the angular relationship to the casing 8 of the load-positioned reference coil at a distance from such casing and without employing a mechanical movement transmission system. Consequently, the present installation employs electrical indicating means which operate the meter 19 shown in FIGURE 5. This meter preferably is calibrated in weight units so that the net load on the vehicle or on a particular component of the vehicle, or the gross weight of the vehicle or on a particular component of the vehicle, will be indicated directly. The reading of the meter 19 will be affected by a change in resistance in the electric circuit in which the meter is connected. The change in circuit resistance is produced by adjustment of a rheostat 20 effected by turning of coil 16 in casing 8 relative to such casing.

While either the winding component, or the contact arm component of the rheostat could be secured against movement relative to the casing 8, it is more convenient to mount the rheostat winding on the casing, as shown in FIGURE 3. The contact arm is then secured to the shaft 18 by which the inner indicating coil 16 is mounted. Such arm is therefore turned by movement of such coil relative to the casing to vary the effective resistance of the rheostat. Since it is preferred that the rheostat be adjusted each time a load reading is to be taken, the coil 16 and arm 8 are normally held in the position of rest shown in FIGURES 3 and 4 by the spiral spring 21 connected between the shaft 18 and an anchor post 22. After such coil has been swung by the interaction of magnetic fields produced by the energized coils to obtain a load reading on meter 19, and the coils are again deenergized, the spring will return coil 16 to the position shown in FIGURES 3 and 4.

In operation the reference coil of the load-sensing device will be turned automatically about its axis by variation in spacing of the frame member 6 and the axle housing 2 resulting from a change in load on the frame. The indicator-activating coil 16 will be connected in circuit with the load-positioned coil 11 so that when an electric current is passed through both of these coils the interaction between their magnetic fields will cause the indicator-activating coil 16 to swing into a position parallel to the load-positioned coil 11 as shown in broken lines in FIGURE 4. Such swinging of coil 16 will move the contact arm of rheostat 20 to a position corresponding to the angular relationship of coil 11 to casing 8 and the effective resistance of the rheostat winding will be altered correspondingly. Since the rheostat is in circuit with the meter 19, such change in rheostat resistance will be reflected in the reading of the meter.

This sensing device will, of course, only sense the load supported by the wheel adjacent to the spring 7. Such a sensing device must therefore be associated with each load-supporting component, such as a wheel or a spring, if the entire load on the vehicle is to be determined. In FIGURE 5 an electric indicating circuit is illustrated in which four load sensing devices are included corresponding to the four wheels or spring supports of a vehicle frame and the sensing devices are integrated into the circuit so that the meter 19 will indicate the composite loads sensed by all four of the sensing devices so as to indicate the entire load on the truck.

Each of the sensing devices illustrated diagrammatically in FIGURE 5 includes a rheostat 20, the resistance of which is adjusted by the cooperating coils 11 and 16 of each pair of reference and indicating coils in the sensing devices. The coils of each pair are connected in series between opposite terminals of a direct current power source 23 which may conveniently be the usual battery of the automotive vehicle. Energization of these coils, however, is controlled by switch 24 which also controls flow of current through the meter 19. The several rheostats 20 are connected in series and are in series with the meter 19, so that this meter will reflect the composite change in resistance in all of the rheostats. It therefore makes no appreciable difference whether the load is uniformly distributed between the several sensing devices so long as a given variation in load anywhere on the truck will effect the same total variation in the collective resistance of the several rheostats.

The switch 24 normally is open and may be of the momentary contact type. Even when the circuit of FIGURE 5 is deenergized relative movement of the frame and spring in each sensing device will, of course, still effect corresponding movement of the reference coil 11 relative to the casing 8. As soon as the switch 24 is closed, interaction of the magnetic fields of the energized coils 11 and 16 of each sensing device will cause the indicator-activating coil in each instance to move into a position parallel to the reference coil and adjust the resistance of its rheostat correspondingly. While current will not flow through the rheostats 20, or the meter 19, as long as switch 24 is open, such closing of the switch will also energize the meter and rheostat circuit so that the meter will indicate the total load on the vehicle as reflected in the adjustment of the several rheostats resulting from movement of the respective indicator-activating coils 16 into positions parallel to the respective load-positioned reference coils 11.

In order to calibrate the meter 19 so that it will indicate zero load when the vehicle is unloaded, a manually adjustable rheostat or variable resistance unit 25 may be included in series with the rheostats 20, as shown in FIGURE 5. The resistance of this unit can be altered one way or the other until the pointer of meter 19 designates a selected zero load index mark. Thereafter it will be unnecessary to adjust this resistance unit for the particular vehicle on which the load indicator is installed, but the provision of such an adjustable resistance unit enables the installation to be made easily on vehicles having somewhat different tare weights.

In addition, coil arms 14 may be made adjustable in effective length, such as being provided with a series of holes to any of which the link 9 can be connected so that the arm can be shortened to swing coil 11 through a relatively small angle for a given variation in spacing of the vehicle components, if such variation in spacing is produced by a relatively small change in load as compared with the change in load required to produce such variation in spacing at another location on the vehicle.

I claim as my invention:

1. A load indicator comprising a reference member, electric circuit-varying means including two relatively movable components, means mounting said reference member for shifting relative to one of said circuit-varying means components in response to variations in a load to be indicated, an indicator-activating member, means mounting said indicator-activating member for movement with the other component of said circuit-varying means and relative to said reference member, means operatively interconnecting said reference member and said indicator-activating member and operable to effect movement of said indicator-activating member into a predetermined relationship to said reference member irrespective of the position of said reference member relative to said circuit-varying means, and indicator means operatively connected to said circuit-varying means and operable to indicate the change in circuit effected by movement of said indicator-activating member and the component of said circuit-varying means movable therewith relative to said reference member.

2. A load indicator comprising a reference coil, electric resistance-varying means including two relatively movable components, means mounting said reference coil for shifting relative to one of said resistance-varying means components in response to variations in a load to be indicated, an indicator-activating coil, means mounting said indicator-activating coil for movement with the other component of said resistance-varying means and relative to said reference coil, means operatively interconnecting said reference coil and said indicator-activating coil and operable to effect movement of said indicator-activating coil into a predetermined relationship to said reference coil irrespective of the position of said reference coil relative to said resistance-varying means, and indicator means operatively connected to said resistance-varying means and operable to indicate the change in resistance effected by movement of said indicator-activating coil and the component of said resistance-varying means movable therewith relative to said reference coil.

3. A load indicator comprising a reference coil, electric resistance-varying means including two relatively movable components, means mounting said reference coil for shifting relative to one of said resistance-varying means components in response to variations in a load to be indicated, an indicator-activating coil connected in circuit with said reference coil, means mounting said indicator-activating coil for movement with the other component of said resistance-varying means and relative to said reference coil, electric energizing means connected to said reference coil and said indicator-activating coil and operable by energization of said coils to effect movement of said indicator-activating coil into a predetermined relationship to said reference coil irrespective of the position of said reference coil relative to said resistance-varying means, and indicator means operatively connected to said resistance-varying means and operable to indicate the change in resistance effected by movement of said indicator-activating coil and the component of said resistance-varying means movable therewith relative to said reference coil.

4. A load indicator comprising a flat reference coil, electric resistance-varying means including two relatively movable components, pivot means mounting said reference coil for swinging relative to one of said resistance-varying means components in response to variations in a load to be indicated, a flat indicator-activating coil connected in circuit with said reference coil, pivot means coaxial with said first pivot means and mounting said indicator-activating coil for turning with the other component of said resistance-varying means and relative to said reference coil, electric energizing means connected to said reference coil and said indicator-activating coil and operable by energization of said coils to effect turning of said indicator-activating coil into parallel relationship to said reference coil irrespective of the position of said reference coil relative to said resistance-varying means, and indicator means operatively connected to said resistance-varying means and operable to indicate the change in resistance effected by turning of said indicator-activating coil and the component of said resistance-varying means movable therewith relative to said reference coil.

References Cited in the file of this patent
UNITED STATES PATENTS
2,473,682     Harris _____ June 21, 1949